United States Patent
D'Silva et al.

[11] 3,805,077
[45] Apr. 16, 1974

[54] METHOD AND APPARATUS FOR DETECTING THE PRSENCE AND QUANTITY OF MERCURY IN A SAMPLE OF ORGANIC MATERIAL

[75] Inventors: Arthur P. D'Silva; Velmer A. Fassel, both of Ames, Iowa

[73] Assignee: The United States of America as represented by the United States Atomic Energy Commission, Washington, D.C.

[22] Filed: Mar. 12, 1973

[21] Appl. No.: 340,628

[52] U.S. Cl.................... 250/372, 250/373, 356/85
[51] Int. Cl. ........................................... G01n 23/00
[58] Field of Search........... 250/372, 373; 23/232 R, 23/254 R; 356/85

[56] References Cited
UNITED STATES PATENTS
2,884,529   4/1959   Eggler et al......................... 250/365
3,571,589   3/1971   Barringer....................... 250/373 X

*Primary Examiner*—Archie R. Borchelt
*Attorney, Agent, or Firm*—John A. Horan; Arthur A. Churm; James W. Weinberger

[57] ABSTRACT

A method and apparatus for detecting the presence and quantity of mercury in a sample of organic material, by heating the material to release the mercury into a flowing atmosphere of argon containing nitrogen, adsorbing the mercury on a mercury-wettable metal filter and revaporizing the mercury into the flowing atmosphere which is then irradiated to excite the mercury to emit its characteristic spectral lines which are detected and analyzed.

12 Claims, 3 Drawing Figures

EFFECT OF He, N₂, Ar & Ar+1% N₂ ON Hg FLUORESCENCE.

QUANTITATIVE NATURE OF Hg FLUORESCENCE AT ppb LEVEL.

METHOD AND APPARATUS FOR DETECTING THE PRESENCE AND QUANTITY OF MERCURY IN A SAMPLE OF ORGANIC MATERIAL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method and apparatus for the detection and analysis of mercury and more particularly for the detection and analysis of extremely low concentrations of mercury contained in organic material.

Mercury concentrations found in environmental materials are very difficult to assess. Information as to "background" and "contaminated" situations in air, water, rocks, soils, sediments, sludges, fossil fuels, plants, animals, foods and man is constantly being collected and evaluated. In a consideration of the transformation of mercury in the environment, it has been concluded that mercury, in whatever form, is potentially exchangeable among the air, land and water phases, and that it represents a unique pollutant because it is essentially indestructible.

A detailed study of the effect of mercury in the environment including the effect on humans may be found in ORNL-NSF-EP-1, "Mercury in the Environment. The Human Element" by Wallace, Fulkerson, Shults and Lyon. Although considerable biological research has been done on the effects of mercury compounds in both intact animals and in vitro systems, the toxic effect of mercury remains essentially unexplained. All mercury compounds are cytotoxic to cells in culture, with organic mercury compounds being an order of magnitude more effective than inorganic mercury compounds. It is known that concentrations of some organic mercury compounds of about 20 ppm will interfere with liver metabolism in some animals, and that as low as 0.25 ppm will affect the chromosome formation in certain insects. It is because of this extreme toxicity of mercury and its compounds that new and improved methods are necessary for the detection and analysis of mercury, and, in particular, for the detection and analysis of mercury at very low levels from organic matter.

A number of techniques for detecting and analyzing for mercury are discussed in the before-mentioned paper. One of the more sensitive mercury determination methods is the flameless or cold-vapor atomic absorption technique. In this method, the mercury is chemically reduced to metallic mercury, volatilized into a long path-length absorption tube and absorption of the 2,537 A resonance line by the entrained mercury vapor is measured. Although this method is simple and sensitive, there is some possibility for error, since many organic substances absorb in the ultraviolet region and such absorption can constitute a significant error in the analysis.

Another sensitive method for measuring low levels of mercury suggests the use of X-ray fluorescence. In this method, a source of low-energy photons such as a monochromatic X-ray source or an isotopic source is used to excite the characteristic X-rays of the sample which are then sorted and measured using a solid-state Ge(Li) or Si detector coupled to a multichannel analyzer. This method is advantageous in that, by using an isotope source, the apparatus may be both portable and relatively inexpensive.

SUMMARY OF THE INVENTION

We have discovered that, by taking advantage of the transfer of electronic energy between atoms, such as is described in detail in "Transfer of Electronic Energy between a Metastable Argon Atom and a Nitrogen Molecule," The Journal of Chemical Physics, Vol. 47, No. 1, July 1967, we have been able to develop a method and apparatus for the detection and analysis of very low levels of mercury. We have found that by this transfer of electronic energy the optical spectrum of mercury can be excited by the irradiation of an argon-nitrogen gas mixture containing vaporized mercury.

Our invention relates to a method and apparatus for the detection and analysis of very low levels of mercury in organic matter by heating the organic matter to release any mercury which may be present into a flowing atmosphere of argon containing nitrogen, adsorbing the mercury from the atmosphere to separate out any vaporized organic matter and other impurities, revaporizing the adsorbed mercury into the flowing atmosphere, irradiating the atmosphere containing the vaporized mercury to excite the mercury atoms to emit their characteristic spectral lines and isolating and detecting the intensity of the spectral lines.

By the method and apparatus of this invention, mercury concentrations as low as about 1 ppb and quantities as low as about 10 picograms may be detected and analyzed with good reproducibility.

The apparatus of this invention is also suitable for use with an isotope irradiation source such as a $Po^{210}$ source, which will permit the apparatus to be portable and relatively inexpensive to acquire and operate.

It is therefore an object of this invention to provide a method and apparatus for the detection and analysis of very low levels of mercury in organic matter.

It is another object of this invention to provide a method and apparatus for the detection and analysis of mercury in organic matter in concentrations as low as about 10 parts per billion and in quantities as low as about 10 picograms.

Finally, it is an object of this invention to provide a method and apparatus for the detection and analysis of very low levels of mercury in organic matter which is simple, effective and accurate.

DESCRIPTION OF THE PREFERRED EMBODIMENT

Figure 1:
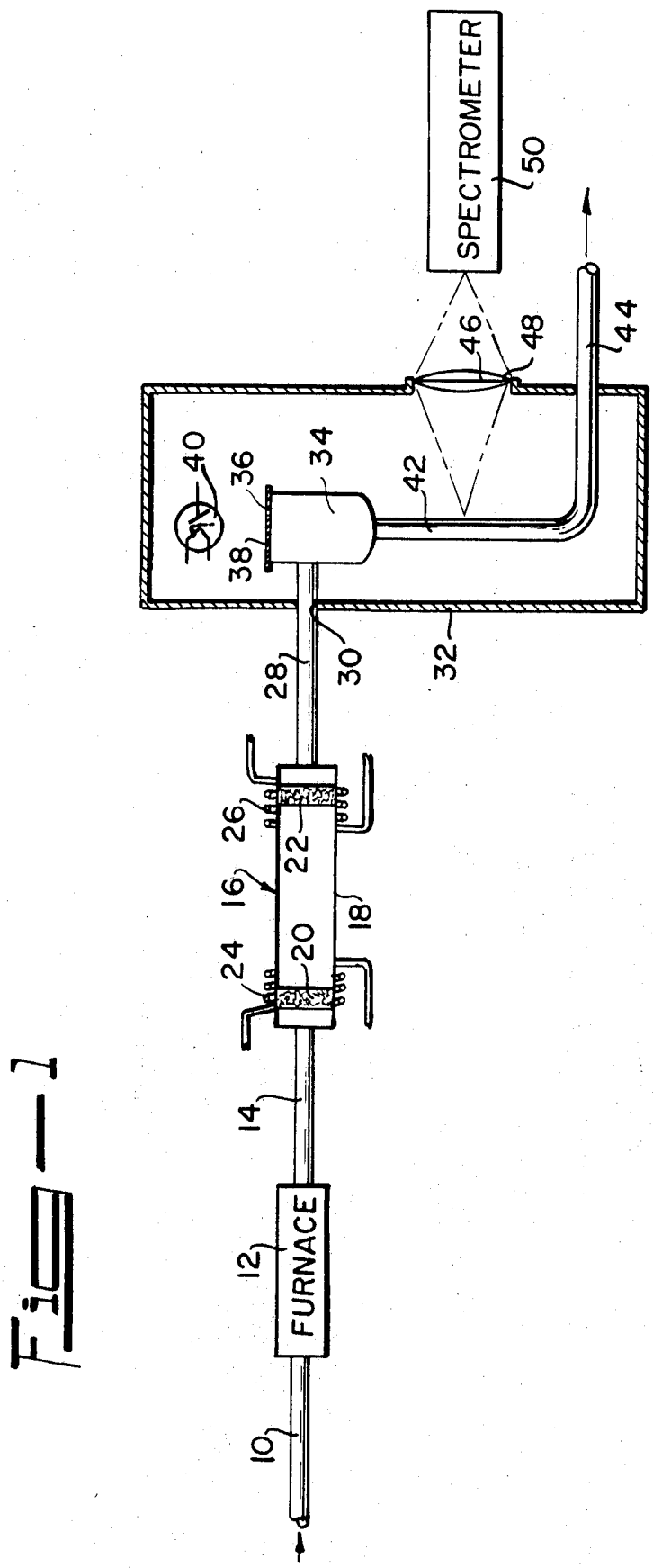
FIG. 1 is a diagram of one embodiment of the apparatus of the invention.

Referring now to FIG. 1, which is one embodiment of the apparatus of the invention, a source of a flowing atmosphere of argon containing nitrogen (not shown) is connected by supply tube 10 to sample furnace 12 which may be any small furnace such as a tantalum strip furnace and is in turn connected by tube 14 with mercury purification furnace 16. The mercury purification furnace 16 consists of horizontal quartz tube 18 containing within the tube near the sample furnace end first mercury-wettable filter 20 and near the opposite end second mercury-wettable filter 22 and having wrapped about the outer circumference of tube 18 adjacent the first filter 20, first heater 24 and wrapped about the outer circumference of tube 18 adjacent the second filter 22, second heater 26. The heaters may be nichrome wire or any other resistance heater wire capable of heating the filter to a temperature sufficient to vaporize any mercury adsorbed thereon. Tube 28 extends from mercury purification furnace 16 through opening 30 in rectangular-shaped lead radiation enclosure 32 to cup-shaped quartz irradiation chamber 34 having open top 36 sealed by Mylar film or aluminum foil 38 directly below X-ray tube 40. Quartz detection tube 42 extends downward from irradiation chamber 34 and joins with horizontal exhaust tube 44 which extends out from enclosure 32. Quartz lens 46 is set in opening 48 in enclosure 32 directly in front of spectrometer 50.

In operation, a sample of organic material suspected of containing mercury is placed in sample furnace 12 and a flowing atmosphere of argon containing nitrogen is started through supply tube 10 into sample furnace 12 at a flow rate of from about 2 to about 5 liters per minute. The sample furnace 12 is heated to from about 1,000° to about 1,200°C. to ash the organic material and release any mercury contained therein into the flowing atmosphere which carries it through tube 14 into mercury purification furnace 16 where the mercury is adsorbed on the first mercury-wettable filter 20. The flow of gas is permitted to continue to remove any vaporized organic material and any other contaminants present from the atmosphere and the first heater 24 is activated to heat the first mercury-wettable filter 20 to about 600°C. to vaporize the mercury into the flowing atmosphere which carries the mercury down the quartz tube 18 to the second mercury-wettable filter 22 where the mercury is again adsorbed and the flow of gas continued to further remove any unwanted matter. The second heater 26 is then activated to heat the second mercury-wettable filter 22 to about 600°C. to vaporize the mercury into the flowing atmosphere where it is carried through tube 28 into irradiation chamber 34 where the gases are irradiated through the Mylar film 38 by X-rays from X-ray tube 40. The X-ray irradiated gases transfer energy to the mercury vapor, exciting the mercury atoms and causing them to emit their characteristic spectral lines. The gas containing the excited mercury atoms flows downward through quartz detection tube 42 where the line spectra of the excited mercury atoms is focused by lens 46 onto the entrance slit of a grating spectrometer 50 where the spectral lines are isolated and analyzed by determining their relative intensity which is proportional to the quantity of mercury present. The gas and mercury vapor then flow into exhaust line 44 where they are carried from enclosure 32 and exhausted to the atmosphere or otherwise collected for disposal.

The argon-nitrogen gas may contain from about 1 molar percent to about 7 molar percent nitrogen, although about 3 to 5 percent is preferred and about 4 molar percent nitrogen is most preferred.

The sample furnace may be any small enclosed furnace such as a tantalum strip furnace, capable of heating a sample of material to a temperature sufficient to ash the material and release any mercury present into the flowing atmosphere. Generally, a temperature of about 1,000° to 1,200°C. is sufficient.

The mercury-wettable filter for adsorbing the mercury from the flowing gas is specific for the removal of mercury as against any other content of the gas. Useful for this purpose is gold wire, gold wool or quartz having its fibers coated with gold. Silver, which also specifically adsorbs mercury as compared with other constituents of the gas, may also be used, but for this purpose the atmosphere would have to be freed of any hydrogen sulfide and any halogens. Other metals which are characterized by wettability and by some solubility in mercury may be used, again with removal of possible constituents of the gas which might react chemically with the metal, but no metal has been found more effective than gold.

Although the use of one mercury adsorption filter within the purification furnace is probably sufficient, two separate filters would ensure that any mercury which passed through the first filter would be adsorbed on the second filter. The furnace was found adequate for purifying the mercury of any vaporized organic matter or any other metals which might be present in the sample and interfere with the accurate detection and analysis of the mercury.

The irradiation or excitation source may be any system where the atomic spectrum of argon and the molecular spectrum of nitrogen, consisting of the second positive and the first positive system, may be utilized for the excitation of mercury resonance lines. For example, it is known that radiation sources such as the alpha activity from $Po^{210}$ or electron beam excitation can produce the desired results as well as X-radiation. Although the range of power of X-ray sources which are suitable to excite the mercury atoms is not completely determined, sources which range from about 10 to about 100 Kev are known to be satisfactory for this purpose.

The characteristic spectral lines of the mercury atom may be isolated by any means known to those skilled in the art. For example, an interference filter or a grating spectrometer can be used to isolate the particular spectral line of interest. Although any one of the more intense spectral lines of the mercury atom can be used to determine relative intensity, the line at 2,537 A is most preferred because of its greater intensity.

The intensity of the spectral lines may be detected by a number of methods known to those skilled in the art, for example by means of a phototube, a photomultiplier tube or by the use of sensitive film.

The X-ray source used with the above-described apparatus was a tungsten target X-ray tube (OEG-50, Machlett Laboratories) operated at between 10 and 50 Kv and 15 to 40 ma and the spectrometer was a 0.25 meter Jarrel-Ash grating spectrometer. The entrance and exit slits of the spectrometer were set at 250 microns and the spectrum was scanned at the rate of 200 A per minute. The fluorescent radiation is detected with an S-20 response, fused silicawindow photomultiplier (RCA 7268). The photocurrent was amplified (Keithley Model 417 Picoammeter) and recorded with a two-pen strip-chart recorder. One of the pens is one-tenth as sensitive as the other, permitting a greater range of spectral intensities to be recorded during a single scan of wavelength.

It is obvious from the foregoing description of the laboratory apparatus used to practice the method of the invention that a number of other types of equipment may come to mind. Therefore the inventors do not wish to be limited to the apparatus as hereinbefore described.

Although the energy transfer mechanism of the system is not exactly clear, a tentative excitation mechanism has been postulated as follows: In an argon-nitrogen system, collisions of the second kind between metastable $Ar(^3P_{0,2})$ atoms generated by X-ray irradiation and nitrogen molecules result in the excitation of the second nitrogen system. Energy transfer by a cascade process results in the subsequent excitation of the first positive and Vegard-Kaplan nitrogen band systems. The energy transfer mechanism may be indicated as follows:

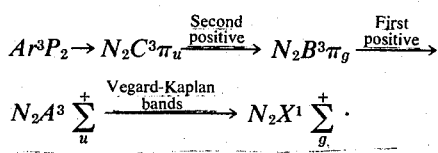

The $N_2A^3\Sigma^+_u$ is metastable and excitation of mercury by energy transfer is known to occur as follows:

$$N_2A^3\Sigma^+_u + Hg^1S_o \rightarrow N_2X^1\Sigma^+_g + Hg^3P_1$$

$$Hg^3P_1 \rightarrow Hg^1S_o + h\nu \; (2{,}537 \; A).$$

The following examples are given as illustrative of the process and apparatus of the invention and are not to be taken as limiting the scope or extent of the invention as defined by the appended claims.

EXAMPLE I

Figure 2:
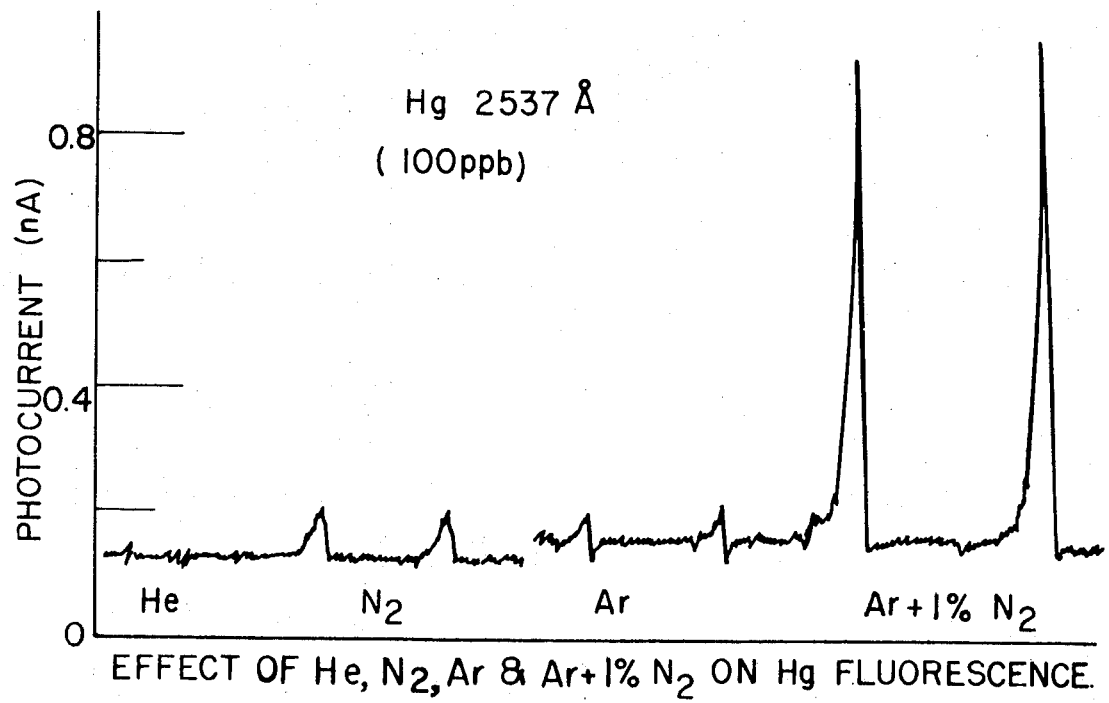
FIG. 2 is a graph showing the relative effect of helium, nitrogen, argon and argon plus 1 percent nitrogen on mercury fluorescence.

An apparatus similar to that described and shown in FIG. 1 except that the gas to be studied was first passed through a generation flask containing an aqueous solution of mercury in 10 percent hydrochloric acid to provide a mercury concentration in the flowing atmosphere of 100 ppb. Several gases including helium, nitrogen, argon and argon + 1 molar percent nitrogen were passed through the generation flask at a flow rate of about 2 liters per minute to vaporize the mercury and carry it to the radiation chamber where the gases were irradiated with 40 Kev X-rays to excite the mercury atoms. The 2,537 A spectral line of mercury was analyzed to determine its relative intensity in the various gases. As seen from the results shown in FIG. 2, the argon - 1 percent nitrogen gas mixture provided a greatly enhanced spectral line intensity as compared to the other gases used.

EXAMPLE II

Figure 3:
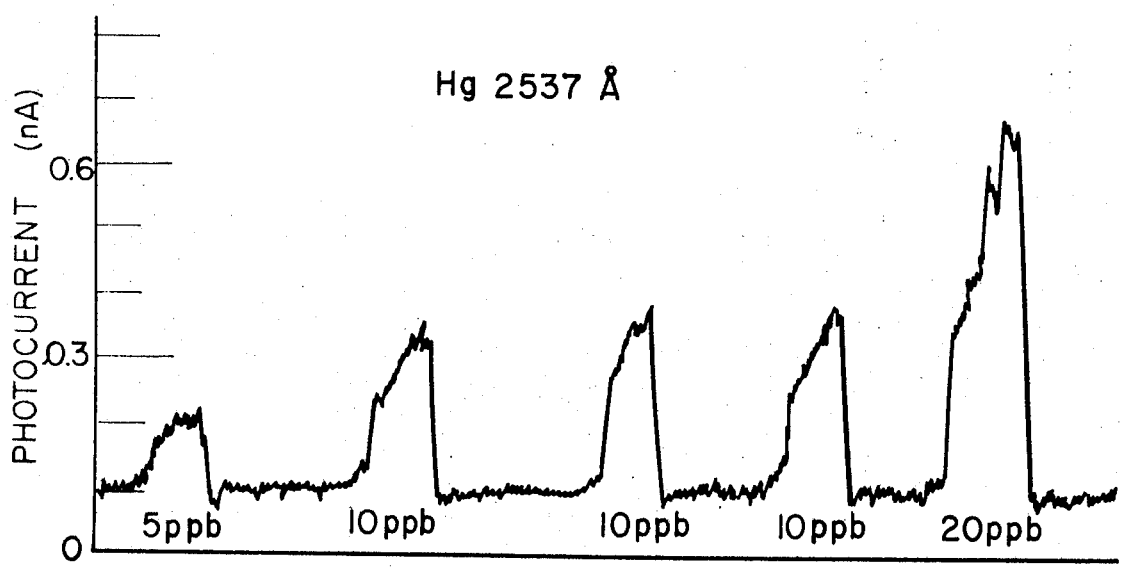
FIG. 3 is a graph showing the quantitative nature of mercury fluorescence at the ppb level.

To determine the intensity of the mercury spectral lines at various mercury concentrations, an experiment was run using the apparatus as described in Example I using a flowing argon - 1 percent nitrogen gas mixture while varying the concentration of mercury. The gas flow rate was 2 liters per minute and the gases were irradiated with 40 Kev X-rays to excite the mercury atoms. As seen from the results shown in FIG. 3, the relative intensity as indicated by the photocurrent is directly proportional to the concentration of mercury in the gas.

EXAMPLE III

Again using the apparatus as described in Example I, and a standard mercury solution, the concentration of nitrogen in argon was varied from about 1 to about 12 molar percent while irradiating the gaseous mixture with 40 Kev X-rays to determine the optimum nitrogen concentration, by comparing the relative intensity of the mercury 2,537 A spectral line at the various concentrations.

TABLE I

| Molar % $N_2$ in Ar | Relative Intensity Hg 2537 Å Line |
|---|---|
| 1.0 | 3.0 |
| 1.8 | 18.0 |
| 2.5 | 36.0 |
| 3.8 | 39.5 |
| 4.7 | 39.0 |
| 5.0 | 37.0 |
| 5.6 | 35.0 |
| 8.0 | 34.0 |
| 10.0 | 29.0 |
| 12.0 | 27.5 |

As seen from the above table, the optimum concentration is from about 3 to about 5 molar percent with 4 molar percent the most preferred. It should be noted that Examples I and II and the results shown in FIGS. 1 and 2 were taken using 1 molar percent nitrogen in argon. As seen above, the relative intensity of the mercury spectral line is greatly enhanced by the use of nitrogen concentrations of from 3 to 5 molar percent over the 1 molar percent concentration used in the previous examples.

EXAMPLE IV

To determine the effectiveness of the recovery of mercury from organic materials, several National Bureau of Standards samples containing known quantities of mercury were weighed and placed in a tantalum strip furnace where they were heated to over about 1,000°C. under a flowing atmosphere of argon containing about 4 molar percent nitrogen to ash the organic material and release the mercury to the atmosphere flowing at a rate of about 5 liters per minute. The mercury was carried by the gas into a quartz tube about 5 mm I.D. and about 15 cm long and adsorbed on a first filter bundle of gold wire about 2 cm long located near the sample furnace end of the tube. The flow of gas was continued to clear the tube of any vaporized organic material. A nichrome heater wire wrapped about the outer circumference of the quartz tube adjacent the first filter bundle was activated to heat the filter bundle to about 600°C. to vaporize the mercury adsorbed thereon into the flowing atmosphere which carried it down the quartz tube where it was adsorbed on a second filter bundle of gold wire located near the opposite end of the tube. A second heater wire wrapped about the outer circumference of the quartz tube adjacent the second filter bundle was activated to heat the filter to about 600°C. to vaporize the mercury adsorbed thereon into the flowing atmosphere which carried the mercury into the quartz irradiation tube as hereinbefore described where the gas was irradiated with X-rays at 40 Kev to excite the mercury to emit its characteristic spectral lines which were then isolated and analyzed to determine the mercury concentration. As can be seen from the results given in Table II below, the process and apparatus are very accurate in detecting and analyzing for the presence of mercury.

TABLE II

| Sample Type | N.B.S. No. | Known Hg Content (ppm) | Analyzed Hg Content (ppm) |
| --- | --- | --- | --- |
| Coal | 1630 | 0.13 | 0.13±0.01 |
| Bovine Liver | 1577 | 0.016 | 0.014±0.001 |
| Orchard Leaves | 1571 | 0.155 | 0.12±0.01 |

It can readily be seen from the above discussion that the method and apparatus of this invention provide an effective and accurate means for the detection and analysis of low levels of mercury contained in organic material.

The embodiments of the invention in which an exclusive property or privilege is claimed are defined as follows:

1. An apparatus for detecting the presence of mercury in organic matter comprising:
   a source of a flowing atmosphere of argon and nitrogen;
   a furnace for heating the organic matter to release any mercury present therein to the flowing atmosphere;
   first means for adsorbing the mercury from the flowing atmosphere;
   a first heater for heating the first adsorbing means to vaporize the mercury into the flowing atmosphere;
   second means for adsorbing the mercury from the flowing atmosphere;
   a second heater for heating the second adsorbing means to vaporize the mercury into the flowing atmosphere;
   means for irradiating the flowing atmosphere containing the vaporized mercury to excite the mercury present to emit its characteristic spectral lines; and
   means for detecting and determining the intensity of the spectral lines.

2. The apparatus of claim 1 wherein the mercury is adsorbed by a mercury-wettable metal filter.

3. The apparatus of claim 2 wherein the mercury-wettable metal is a noble metal.

4. The apparatus of claim 3 wherein the irradiating means is an X-ray tube.

5. The apparatus of claim 3 wherein the irradiating means is polonium-210.

6. The apparatus of claim 3 wherein the irradiating means is an electron beam source.

7. A method for detecting the presence of mercury in organic matter comprising:
   establishing and maintaining a flowing atmosphere of argon containing nitrogen;
   heating the organic matter to release the mercury present therein into the atmosphere;
   passing the atmosphere containing the mercury through a first mercury-adsorbing filter, whereby the mercury is adsorbed on the filter;
   heating the first filter to vaporize the mercury into the flowing atmosphere;
   irradiating the atmosphere containing the vaporized mercury to excite the mercury atoms to emit their characteristic spectral lines; and
   isolating and detecting the spectral lines to determine the presence of mercury.

8. The method of claim 7 including the additional steps of passing the atmosphere containing the vaporized mercury from the first filter through a second mercury-adsorbing filter whereby the mercury is adsorbed on the filter; and
   heating the second filter to vaporize the mercury into the flowing atmosphere before irradiation thereof.

9. The method of claim 8 wherein the flowing atmosphere of argon contains 1 to 7 molar percent nitrogen.

10. The method of claim 9 wherein the organic matter is heated to from 1,000° to 1,200°C.

11. The method of claim 10 wherein the mercury atoms are excited by irradiating the atmosphere containing the vaporized mercury with X-rays, alpha-rays or electron beam radiation.

12. The method of claim 11 wherein the mercury is adsorbed from the atmosphere by a mercury-wettable metal.

* * * * *